United States Patent

Karp et al.

[11] Patent Number: 5,515,308
[45] Date of Patent: May 7, 1996

[54] FLOATING POINT ARITHMETIC UNIT USING MODIFIED NEWTON-RAPHSON TECHNIQUE FOR DIVISION AND SQUARE ROOT

[75] Inventors: Alan H. Karp, Sunnyvale; Peter Markstein, Woodside; Dennis Brzezinski, Sunnyvale, all of Calif.

[73] Assignee: Hewlett-Packard Company, Palo Alto, Calif.

[21] Appl. No.: 524,966

[22] Filed: Sep. 8, 1995

Related U.S. Application Data

[60] Continuation of Ser. No. 246,530, May 20, 1994, abandoned, which is a division of Ser. No. 58,164, May 5, 1993, Pat. No. 5,341,321.

[51] Int. Cl.[6] .................................................. G06F 7/38
[52] U.S. Cl. ............................................................ 364/748
[58] Field of Search .................................... 364/748, 752, 364/761, 736

[56] References Cited

U.S. PATENT DOCUMENTS

| | | | |
|---|---|---|---|
| 4,594,680 | 6/1986 | Schomburg et al. | 364/765 |
| 4,999,801 | 3/1991 | Katsuno | 364/748 |
| 5,042,001 | 8/1991 | Brightman et al. | 364/736 |
| 5,220,524 | 6/1993 | Hesson | 364/748 |

Primary Examiner—Tan V. Mai

[57] ABSTRACT

A floating point processing system which uses a multiplier unit and an adder unit to perform floating point division and square root operations using both a conventional and a modified form of the Newton-Raphson method. The modified form of the Newton-Raphson method is used in place of the final iteration of the conventional Newton-Raphson so as to compute high precision approximated results with a substantial improvement in speed. The invention computes approximated results faster and simplifies hardware requirements because no multiplications of numbers of the precision of the result are required.

10 Claims, 6 Drawing Sheets

FLOATING POINT ARITHMETIC UNIT USING MODIFIED NEWTON-RAPHSON TECHNIQUE FOR DIVISION AND SQUARE ROOT

CROSS REFERENCE TO RELATED APPLICATION

This is a continuation of application Ser. No. 08/246,530 filed on May 20, 1994, now abandoned, which is a divisional of application Ser. No. 08/058,164 filed on May 5, 1993 now U.S. Pat. No. 5,341,321.

BACKGROUND OF THE INVENTION

1. Field of the Invention

The present invention relates to a data processing system having a floating point arithmetic unit and, more particularly, to a method and apparatus for performing floating point division and square root operations.

2. Description of the Related Art

Floating point arithmetic units have long be able to perform division and square root operations. Although dedicated division and square root circuitry has been used in data processing systems to perform division and square root operations, the current trend is to perform these operations using circuitry associated with multiplication and addition. Examples of data processing systems using a multiplier and adder to perform division or square roots are contained in European patent application 89313402.3 (EPO publication no. 0377992 A2), European patent application 85106938.5 (EPO publication no. 0166999 A2), and European patent application 82111929.4 (EPO publication no. 0111587 A1).

By eliminating dedicated division and square root circuitry from the designs of floating point arithmetic units, designers of data processing systems can not only reduce costs but also conserve board or die space. In these data processing systems, division and square root operations are performed using the multiplier and the adder of the floating point arithmetic unit. This allows more design time, power and area to be focused on the much more frequently used adder and multiplier hardware. Since it has been estimated that approximately only one-tenth of the operations performed in a data processing system involve a division or square root operation, such designs are feasible. However, a nagging problem with this approach is that division and square root operations take considerably longer to compute than do addition and multiplication operations. This difference in computation time is due to the fact that addition and multiplication operations are computed directly, while division and square root operations are computed indirectly with an iterative procedure.

Iterative procedures for division can be grouped into different classes depending on their iterative operator. One class uses substraction as the iterative operator (e.g., non-restoring division), and another class uses multiplication as the iterative operator. The iterative procedures which use multiplication as the iterative operator are preferred because they compute the result much faster. More specifically, for division, these iterative procedures are used to obtain a reciprocal of the divisor, and then to obtain the quotient, the resulting reciprocal is multiplied by the dividend. There are two well known iterative methods which use multiplication as the iterative operator to determine the reciprocal, namely series expansion and Newton-Raphson. Of these iterative methods, the Newton-Raphson method is most often used. A general discussion on iterative procedures for division may be found in Waser and Flynn, *Introduction to Arithmetic For Digital Systems Designers*, New York, 1982.

The Newton-Raphson method is a particularly attractive computational method for a high speed computer having a floating point multiplier and a floating point adder-subtractor. The Newton-Raphson method is useful for not only division, but also for square root. With each iteration, the Newton-Raphson method converges quadratically to its result.

Conventionally, the Newton-Raphson iteration is used to obtain an approximation to the inverse of the denominator in the case of division or the inverse square root in the case of square root. Thereafter, each subsequent Newton-Raphson iteration increases the precision of the inverse value. Once the desired precision is reached, the inverse value is multiplied by the numerator in the case of division or the input argument in the case of square root. Although the conventional approach works quite well when the results are computed to no more precision than that offered by the hardware associated with addition and multiplication, the conventional approach is unsatisfactory when higher precision results are needed. Specifically, it takes an inordinate amount of time to perform the final multiplication (final inverse value times the numerator) for higher precision results.

Thus, there is a definite need for an improved technique for obtaining high precision results of division and square root operations that operates at a considerably faster speed than the conventional approach.

SUMMARY OF THE INVENTION

Broadly speaking, the invention obtains high precision division and square root results using a modified form of the Newton-Raphson method in which no multiplications of numbers of the precision of the result are required.

An embodiment of the invention performs floating point division and square root operations in an arithmetic processing system having a multiplier unit and an adder unit. To perform the divide and square root instructions, divide and square root microcode incorporates iterative procedures based on both the conventional form of the Newton-Raphson method and the modified form of the Newton-Raphson method. By using the modified form of the Newton-Raphson Method, the invention achieves a substantial improvement in the speed with which results for high precision division and square root are computed. The invention also makes a hardware implementation practical because an approximate result with almost 2N-bits of precision can be obtained without a 2N-by-2N wide multiplier.

As an apparatus, the invention is associated with a floating point arithmetic unit. The invention enables the floating point arithmetic unit to perform floating point division of a dividend by a divisor to produce an estimated quotient or floating point square root of a value to produce an estimated square root. The apparatus includes a multi-ported storage device for storing data, arithmetic means for multiplying two numbers to produce a product and for adding two numbers to produce a sum, divide and square root microcode containing iterative procedures for performing the divide and square root operations, reciprocal approximation means for containing initial approximations for the reciprocal values of the divisor and reciprocal values of the square root of the value, and a control unit for controlling the floating point unit. The iterative procedures contained in the divide and square root microcode carry out the divide and square root operations to produce the estimated quotient and square root having a precision near 2N-bits without requiring any 2N-by-2N bit multiplications.

As a method, the invention performs a division or square root operation in a data processing system to produce a high precision result. Initially, an approximation of a reciprocal value is obtained. The approximation of the reciprocal value may, for example, be obtained from a reciprocal approximation table. Next, one or more iterations of a conventional Newton-Raphson method are performed to improve the precision of the reciprocal value. Thereafter, an additional iteration is performed using a modified Newton-Raphson method to produce the high precision result.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention is intended for use in a floating point arithmetic unit. The invention enables a floating point arithmetic unit to produce results with a precision which is at least twice that offered by the hardware. Preferably, the invention yields a 2N-bit approximation (full precision) from an N-bit approximation (half precision). For example, if the hardware is able to provide the double precision results, the invention will provide quad precision results. The invention is equally applicable to multiprecision numbers. Multiprecision numbers are numbers having a precision greater than quad precision. These numbers may be stored in a single precision floating point array. In one implementation, the first word in the array is an integer valued floating point number whose absolute value represents the number of words in the mantissa. The sign of the first word is the sign of the multiprecision number. The next word is an integer valued floating point number representing the exponent of the number base. The decimal point follows the first mantissa word. Known software library routines are available to carry out mathematical operations on these numbers. See e.g., Bailey, *A Portable High Performance Multiprecision Package*, RNR Technical Report RNR-90-022, NAS Applied Research Branch, NASA Ames Research Center, Moffett Field, Calif., May 1992.

Embodiments of the invention are discussed below with reference to FIGS. 1–6. However, those skilled in the art will readily appreciate that the detailed description given herein with respect to these figures is for explanatory purposes as the invention extends beyond these limited embodiments.

Figure 1:
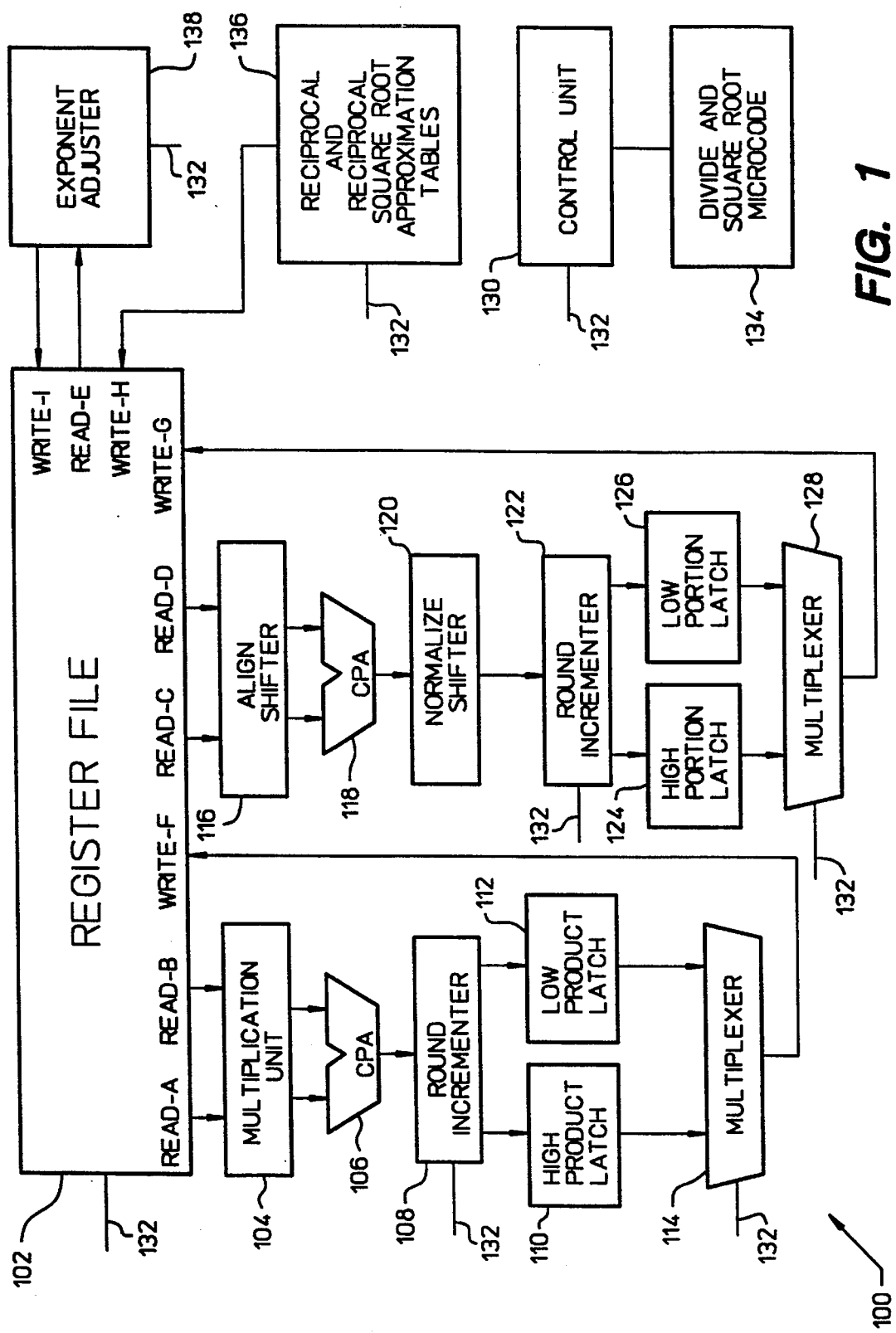
FIG. 1 is a block diagram of a floating point arithmetic unit according to a first embodiment of the invention.

FIG. 1 illustrates a first embodiment of a floating point arithmetic unit 100. This embodiment stores quad precision numbers in a double-double format. The arithmetic unit 100 includes separate circuitry for multiplication and addition.

A multi-port register file 102 includes read ports A, B, C, D and E, and write ports F, G, H and I. The register file 102 stores dam having a N-bit word size. A multiplication unit 104 is coupled read ports A and B to respectively receive a multiplicand and a multiplier. The multiplication unit 104 provides a high partial product and a low partial product to a carry propagate adder (CPA) 106. The CPA 106 adds the high and low partial products. The sum produced by the CPA 106 is then rounded to 2N-bits by a round, incrementer 108.

The rounded result consists of two N-bit portions which are respectively held in a high product latch 110 and a low product latch 112. A multiplexer 114 receives the latched N-bit portions from the latches 110, 112. The output of the multiplexer 114 is connected to write port F of the register file 102 so that the two N-bit portions of the multiplication operations can be stored in the register file 102 in two write operations, one for the high portion and one for the low portion.

Accordingly, read ports A and B provide the multiplicand and the multiplier to the multiplication unit 104. The results of the multiplication consist of two N-bit values which are rounded and forwarded to the write port F of the register file 102 for temporary storage.

Other ports of the register file 102 are associated with the addition circuitry of the floating point arithmetic unit 100. An align shifter 116 receives the addends from read ports C and D of the register file 102 and aligns them for addition. A carry propagate adder (CPA) 118 then adds the aligned values and supplies a sum to a normalize shifter 120. The normalized sum is then rounded to 2N-bits by a round incrementer 122 to produce a rounded sum. The first N-bits of the rounded sum are latched in a high portion latch 124, and the second N-bits of the rounded sum are latched in a low portion latch 126. A multiplexer 128 receives the latched sums from latches 124, 126 as inputs and forwards the latched sums back to write port G in two passes.

A control unit 130 receives instructions to be executed and provides the necessary control signals 132 to the various circuits as illustrated in FIG. 1. Hence, the control unit 130 controls the multiplication and addition circuitry to carry out the instructions.

In order to adapt the floating point arithmetic unit 100 so as to properly execute divide and square root instructions using its multiplication and addition circuitry, divide and square root microcode 134 is accessible to the control unit 130. The iterative procedures contained within the divide and square root microcode 134 are discussed in detail below. Since the iterative procedures begin with an initial guess or approximation of a reciprocal or a reciprocal square root, reciprocal and reciprocal square root approximation tables 136 are included within the floating point arithmetic circuit 100. These approximation values are supplied to the register file 102 so that they may be used in either the multiplication circuitry or the addition circuitry. Table 1 illustrates a few examples (in decimal format) of a reciprocal approximation table and Table 2 illustrates the same for a reciprocal square root approximation table.

TABLE 1

Division

| A | Approx. 1/A |
| --- | --- |
| 0.1 | 10.0 |
| 0.2 | 5.0 |
| 0.3 | 3.33 |
| 0.4 | 2.50 |
| 0.5 | 2.00 |
| 0.6 | 1.67 |
| 0.7 | 1.43 |
| 0.8 | 1.25 |
| 0.9 | 1.11 |
| 1.0 | 1.00 |

TABLE 2

Square Root

| A | Approx. sqrt(1/A) |
| --- | --- |
| 0.1 | 3.16 |
| 0.2 | 2.24 |
| 0.3 | 1.83 |
| 0.4 | 1.58 |
| 0.5 | 1.41 |
| 0.6 | 1.29 |
| 0.7 | 1.20 |
| 0.8 | 1.12 |
| 0.9 | 1.05 |
| 1.0 | 1.00 |

The actual approximation tables would contain many more entries in hexadecimal notion much like that shown in Appendix A of European patent application 9313402.3 (EPO publication no. 0377992 A2), which is hereby incorporated by reference.

In any case, the approximations stored in the approximation tables 136 provide only the first few bits of the desired reciprocal. Since a table for all possible floating point numbers would be impractically large, an exponent adjuster 138 is provided to extract and adjust the exponent. The exponent adjuster 138 stores and obtains data from the register file 102 via write port I and read port E, respectively. By treating the exponent and mantissa fields of floating point numbers separately, the approximation tables can be built with a manageable size. For division, the mantissa bits are used to select the appropriate entry from the approximation tables 136, and the exponent adjuster 138 extracts the exponent and adjusts it by taking the negative of the exponent. For square root, the mantissa is again used to select the appropriate entry from the approximation tables 136, but the exponent adjustment is more complicated. If the exponent is even, the exponent adjuster 138 reduces the exponent by one-half. If the exponent is odd, the exponent adjuster 138 modifies the exponent to one-half of one less than the exponent. In either case, the adjusted exponent is combined with the iterative procedure before the approximation is used.

Figure 2:
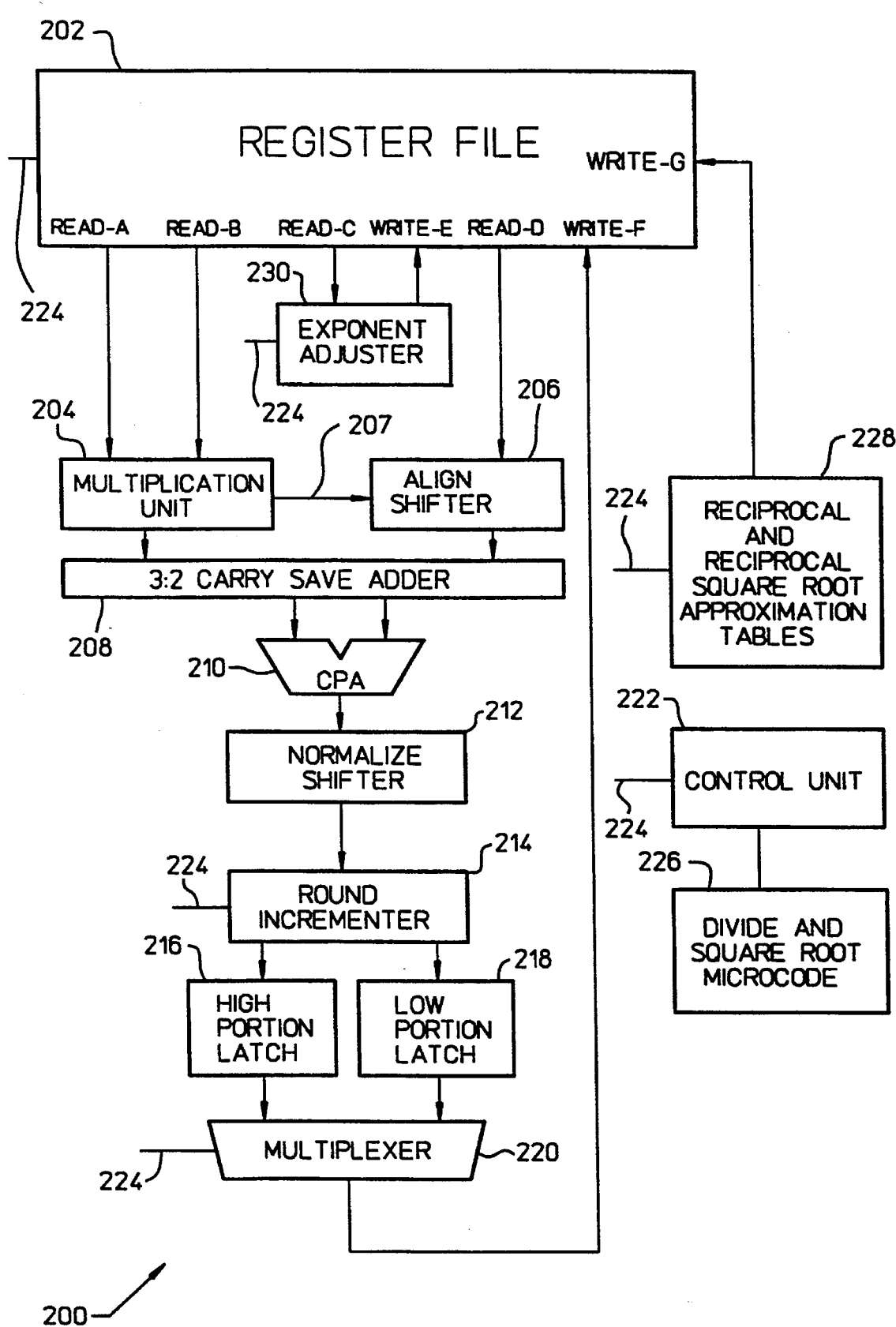
FIG. 2 is a block diagram of a floating point arithmetic unit in accordance with a second embodiment of the invention.

FIG. 2 is a block diagram of a floating point arithmetic unit 200 according to a second embodiment of the invention. The floating point arithmetic unit 200 illustrated in FIG. 2 is a multiply-add-fused (MAF) design. That is, a multiplication unit and an adder are fused together so that multiplication and addition may occur as one atomic operation.

A multi-port register file 202 includes read ports A, B, C and D and write ports E, F and G. A multiplication unit 204 receives a multiplicand and a multiplier from read ports A and B and produces a product. An align shifter 206 receives an addend from read port D and aligns the addend in accordance with the exponent of the product using a signal 207 from the multiplication unit 204.

A 3:2 carry save adder 208 receives inputs from the multiplication unit 204 and the align shifter 206 and provides at least 2N-bits of output to a carry propagate adder 210. The invention only requires use of the leading 2N-bits from the carry save adder 208. The carry propagate adder 210 produces a 2N-bit result which is then normalized by a normalize shifter 212 and rounded to a 2N-bit result by a rounded incrementer 214. The rounded result is then supplied in two N-bit portions to a high portion latch 216 and a low portion latch 218, respectively. A multiplexer 220 receives the latched N-bit portions from the latches 216, 218. The output of the multiplexer 220 is connected to write port F of the register file 202 so that the two N-bits portions can be stored in the register file 202 in two write operations, one for the high portion and one for the low portion.

A control unit 222 receives and carries out an instruction. More particularly, the control unit 222 controls the circuitry of the floating point arithmetic unit 200 using various control signals 224. When the instruction received at the control unit 222 is either a divide instruction or a square root instruction, the control unit 222 accesses divide and square root microcode 226 so as to execute the iterative procedures required to perform division and square root operations using multiplication and addition circuitry.

Although the iterative procedures required are discussed in detail below, the iterative procedures do require the use of initial approximations or guesses for a reciprocal value or a reciprocal square root value which are stored in reciprocal and reciprocal square root approximation tables 228. Tables 1 and 2 above contains an example of a reciprocal approximation table and a reciprocal square root approximation table. The appropriate approximations are selected by the control unit 222 (via the control signals 224) and supplied to write port G so that the floating point arithmetic unit 200 can perform the iterative procedures requested by the microcode 226. An exponent adjuster 230 is connected to read port C and write port E of the register file 202 and functions the same as the exponent adjuster 138 discussed above.

For performance reasons, the first and second embodiments (FIGS. 1 and 2) may be further enhanced using well known circuitry. For example, to facilitate pipelining additional latches may be added between the register file and the multiplication unit or the align shifter. Multiplexers could also be inserted between the register file 102 and the multiplication unit 104 and the align shifter so as to more quickly feed the multiplication unit or align shifter with inputs. Nevertheless, these and numerous other well known enhancements are not part of the invention but are primarily design choices for the hardware and for that reason are not discussed further herein.

Further, although the first and second embodiments (FIGS. 1 and 2) are described as having reciprocal approximation tables 136, 228, the initial guess or approximation of a reciprocal or a reciprocal square root can be obtained by other means. For example, it is known in the art that such approximations are obtainable using a polynomial equation to obtain coefficients which are used to produce the approximation. See e.g., Cody and Waite, Software Manual for the Elementary Functions, pp. 17–27, 1980; A. Karp, Speeding up N-Body *Calculations on Machines without Hardware Square Root*, IBM Scientific Center, Doc. No. G320-3565, April 1992.

Figure 3:
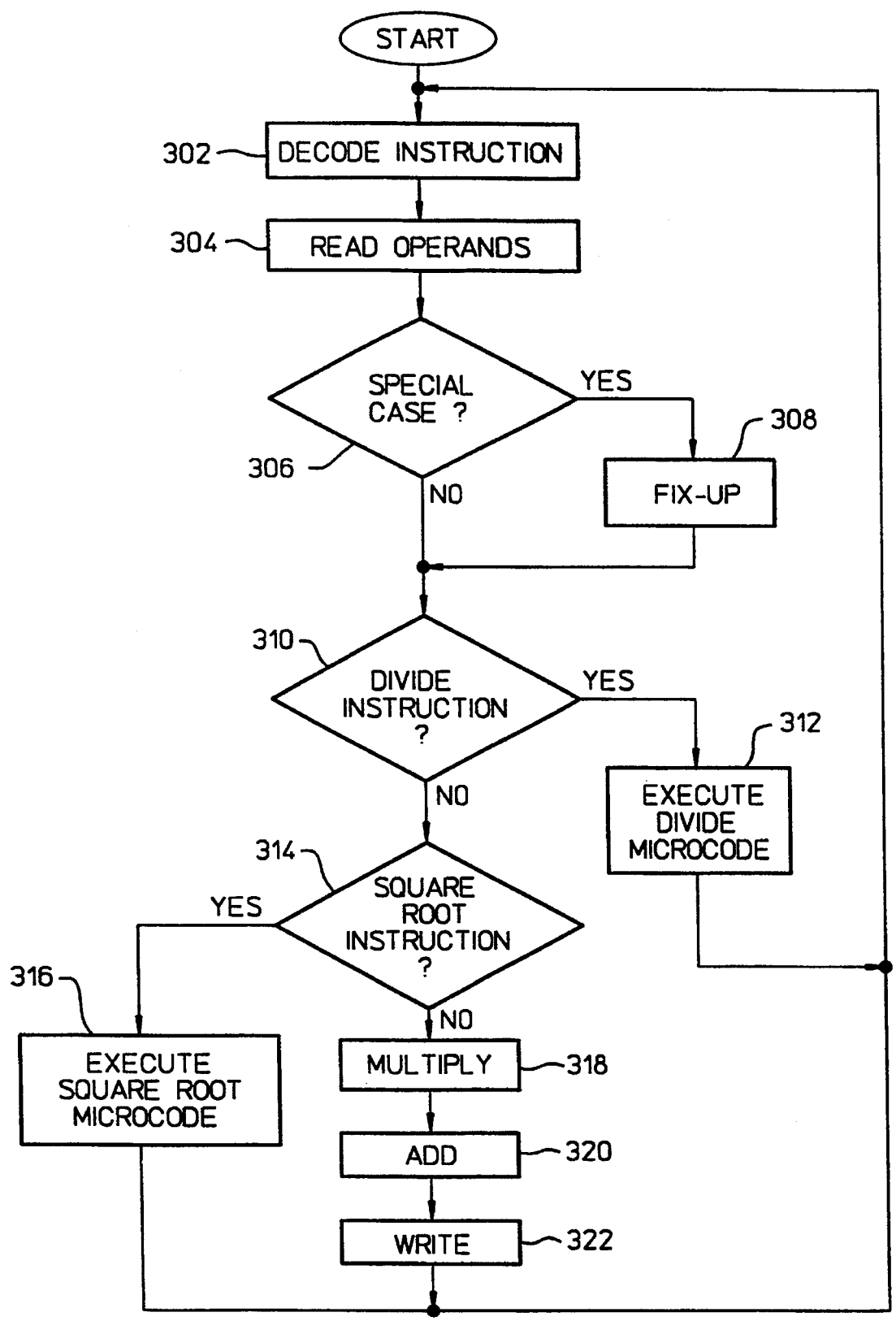
FIG. 3 is a flow chart of the basic operations performed by a control unit.

FIG. 3 is a flow chart of the basic procedures performed or controlled by the control unit 130, 222. When the control unit 130, 222 receives an instruction, various operations occur in a floating point arithmetic unit. Initially, the instruction is decoded 302 and its operands are read 304. Next, a decision 306 is made based on whether or not a special case exists. A special case exists when the operands are not normal numbers. If the operands are not normal numbers, the operations are "fixed-up" 308 according to the IEEE standard 754–1985 and then flow control continues as if the numbers were initially normal. For example, if one of the numbers is $0.02 \times 10^{-3}$, then it would be "fixed-up" (in this case normalized) to $0.2 \times 10^{-4}$ before processing continues.

Next, a decision 310 is made based on whether or not the instruction is a divide instruction. If the instruction is a divide instruction, the control unit 130, 222 executes 312 the divide microcode 156, 238. Upon completion of the divide microcode 134, 226, the control flow returns to step 302 for decoding of the next instruction.

If the decision 310 determines that the instruction is not a divide instruction, a decision 314 is made based on whether the instruction is a square root instruction. If the instruction is a square root instruction, the control unit 130, 222 executes the square root microcode 134, 226 and thereafter returns the control flow to step 302 for the decoding of the next instruction. If, on the other hand, the instruction is determined 314 not to be a square root instruction, then a multiply operation 318 and/or an add operation 320 are carried out in conventional fashion by the multiplication unit 104, 204 and the adder 118, 208 illustrated in FIGS. 1 and 2. Thereafter, a result is written 322 back to the register file 102, 202 for temporary storage.

Figure 4:
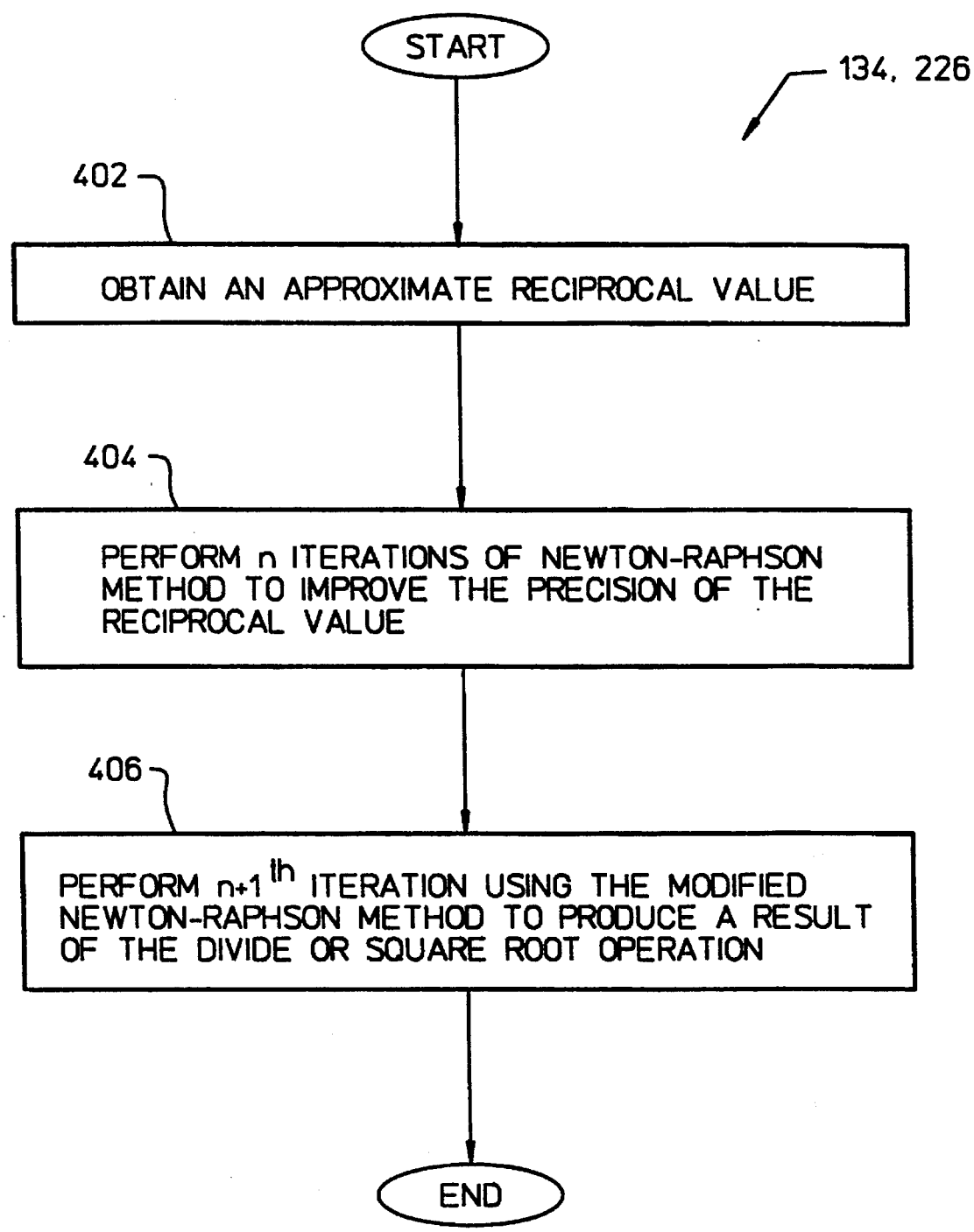
FIG. 4 is a flow chart of the basic operations carried out by divide and square root microcode.

FIG. 4 is a flow chart of the basic procedure effectuated by the divide and square root microcode 134, 226. The procedure begins by obtaining 402 an approximate reciprocal value. The initial reciprocal values for either the divisor in the case of division or the square root itself in the case of square root are stored in the reciprocal and reciprocal square root approximation tables 136, 228. Examples of these tables 136, 228 are contained in Tables 1 and 2 discussed above. When a divide or square root instruction is received at the control unit 130, 222, the control unit 130, 222 accesses the reciprocal and reciprocal square root approximation tables 136, 228 to obtain 402 an approximate reciprocal value. For example, if an instruction is received to divide 1 by 0.9, the control unit 152, 222 would access the table 136, 228 using the divisor as an index so as to retrieve the value 1.11.

Next, the procedure operates to perform 404 n iterations of the Newton-Raphson Method to improve the precision of the reciprocal value. These n iterations use a conventional form of the Newton-Raphson method which is known to those skilled in the art. The improvement in precision of the reciprocal value converges geometrically using the Newton-Raphson Method. Once the first n iterations of the Newton-Raphson Method have been performed, the last or $(n+1)^{th}$ iteration is performed 406 using a modified Newton-Raphson Method. This last iteration operates to directly produce the result, that is, the value of the quotient or the square root.

The benefit of the invention is that the final iteration operates to multiply two half precision numbers, whereas the conventional technique would require the multiplication of two full precision numbers as a separate step beyond the last iteration of the Newton-Raphson Method which in the conventional case only provides the reciprocal value.

The procedure utilized by the invention to obtain a quotient or square root contains various combinations of precisions from multiplication operations. Some of these combinations of precisions are illustrated in Table 3.

TABLE 3

| Input | Input | Output | Operation | Relative Cost | | | |
| --- | --- | --- | --- | --- | --- | --- | --- |
| | | | | $Q_h$ | $Q_s$ | C | F |
| Full | Full | All Bits | $P_{4d}=A*B$ | 11 | 132 | 8 | 4 |
| Full | Full | Full | $R_{2d}=A*B$ | 8 | 84 | 4 | 4 |
| Full | Half | All Bits | $Q_{3d}=A*b$ | 7 | 96 | 3 | 2 |
| Full | Half | Full | $S_{2d}=A*b$ | 4 | 48 | 2 | 2 |
| Full | Half | Half | $T_d=A*b$ | 3 | 36 | 2 | 1 |
| Half | Half | Full | $U_{2d}=a*b$ | 1 | 12 | 2 | 1 |
| Half | Half | Half | $V_d=a*b$ | 1 | 1 | 1 | 1 |

In Table 3, the notation is as follows. A and B are full precision numbers of 2N digits, while a and b are half precision numbers of N digits. The subscript (kd) indicates the number (k) of half precision words in the result, with (d) denoting the hardware precision. For example, $V_d$ can be computed in hardware, and $U_{2d}$ may be available in hardware but, if not, software (discussed below) may use a single-single representation to produce the same. The cost estimates contained in Table 3 are for double precision operations that return Quad precision results done in hardware ($Q_h$) and in software ($Q_s$). In addition, the cost estimates for conventional multiprecision operations up to a few hundred digits (C) and for fast Fourier transform multiplication of numbers of more than a few hundred digits (F). The relative costs are relative to a half precision times half precision multiplication which is assumed to take unit time.

The operations associated with the divide and square root microcode 134, 226 are separately discussed in detail below. Divide microcode is executed to perform a divide instruction, while square root microcode is executed to perform a square root instruction.

The operations performed by the divide microcode are discussed immediately below with reference to FIG. 5 which is a flow chart of the detailed operations carried out by the divide microcode. The divide microcode incorporates both the conventional Newton-Raphson method and the modified Newton-Raphson method so as to yield the benefits of the invention.

To perform division, the Newton-Raphson method first determines a reciprocal of the divisor and then the resulting reciprocal is multiplied by the dividend. The division process may be represented by the following equation.

$$\frac{B}{A} = \left(\frac{1}{A}\right) \times B$$

Generally, each iteration for the reciprocal of the value (A) according to the Newton-Raphson method may be represented by the following equation.

$$X_{n+1}=X_n+X_n(1-Ax_n)$$

The first n iterations (i.e., all but the last iteration) of a high precision calculation are performed 404 using the above equation as is conventionally done. Each iteration includes the operations of obtaining 502 an initial guess for a reciprocal of the divisor in accordance with a reciprocal table such as shown in Table 1, determining 504 a residual error for the guess, and increasing 506 the precision of the guess based on the residual error and the existing guess.

The number of iterations required to produce the result to a specified precision depends on the precision of the initial guess. For example, if the initial guess from the reciprocal table is accurate to 8-bits and the result is to be 128 bits, then a total of four iterations are required. In this case, the first three (i.e., n) iterations use the conventional Newton-Raphson method, and the last and fourth iteration used the modified Newton-Raphson method. Since the precision doubles with each iteration, when the precision is determined 508 to be greater than or equal to N-bits, then only one more iteration is needed to obtain a result with 2N-bits of precision. With respect to the above example, when the precision of the guess equals or exceeds 64 bits, the iterations of the conventional Newton-Raphson method may cease.

Preferably, as long as the approximation is less accurate than the base number format (i.e., <N), early iterations use hardware addition and multiplication. At each iteration beyond this accuracy, the number of digits carried is doubled to match the accuracy of the approximation, see Bailey, *A Portable High Performance Multiprecision Package*, RNR Technical Report RNR-90-022, NAS Applied Research Branch, NASA Ames Research Center, Moffett Field, Calif., May 1992.

The invention modifies the conventional Newton-Raphson method by performing the multiplication by the value (B) before the last iteration (n+1$^{th}$ iteration) in the determination of the reciprocal of the value (A). The following equations show how the last iteration for the reciprocal calculation is modified by the preferred embodiment of the invention.

Conventionally, the last iteration may be expressed as follows.

$$X_{n+1} = X_n + X_n(1 - Ax_n)$$

At this point, prior to performing the last iteration as would be done conventionally, the last iteration is multiplied by the value (B). The last iteration can then be expressed as follows.

$$Bx_{n+1} = Bx_n + Bx_n(1 - Ax_n)$$

Thereafter, the above equation is simplified by bringing the value (B) inside the parenthesis. As a result, the above equation may be rewritten as follows.

$$Bx_{n+1} = Bx_n + x_n(B - A(Bx_n))$$

The above equation can be further simplified by assigning $y_n = Bx_n$. The final iteration of the Newton-Raphson for division in accordance with the invention can then be expressed by the following equation.

$$Y_{n+1} = Y_n + X_n(B - Ay_n)$$

There is significance to bringing the multiplicand inside the parentheses. Namely, the result is that the residual error $(B - Ay_n)$ is computed based on the number being corrected, i.e., $y_n$. Hence, $y_{n+1}$ will have almost 2N-bits correct even if $y_n$ is computed to only N-bits.

Further, $y_{n+1}$ is the desired approximate final result of the division of B/A which is accurate to nearly the number of digits in a full precision number. Specifically, the final result is accurate to a few Units in the Last Place (ULP).

The individual operations for the final iteration of the modified Newton-Raphson method may then be performed 406 according to the following steps of Table 4.

TABLE 4

| | OPERATION | PRECISION |
|---|---|---|
| Step 1: | $y_n = Bx_n$ | [half = half* × half] |

* only need to use high-order part of B

TABLE 4-continued

| | OPERATION | PRECISION |
|---|---|---|
| Step 2: | $T = Ay_n$ | [full* = full × half] |
| | * all bits of product | |
| Step 3: | $t = B - T$ | [half = full − full] |
| Step 4: | $t = X_n t$ | [half = half × half] |
| Step 5: | $y_{n+1} = y_n + t$ | [full* = half + half] |
| | * leading 2n bits of the sum | |

In a multiply-add-fused (MAF) design (FIG. 2), steps 2 and 3 as well as steps 4 and 5 may be fused to together.

Figure 5:
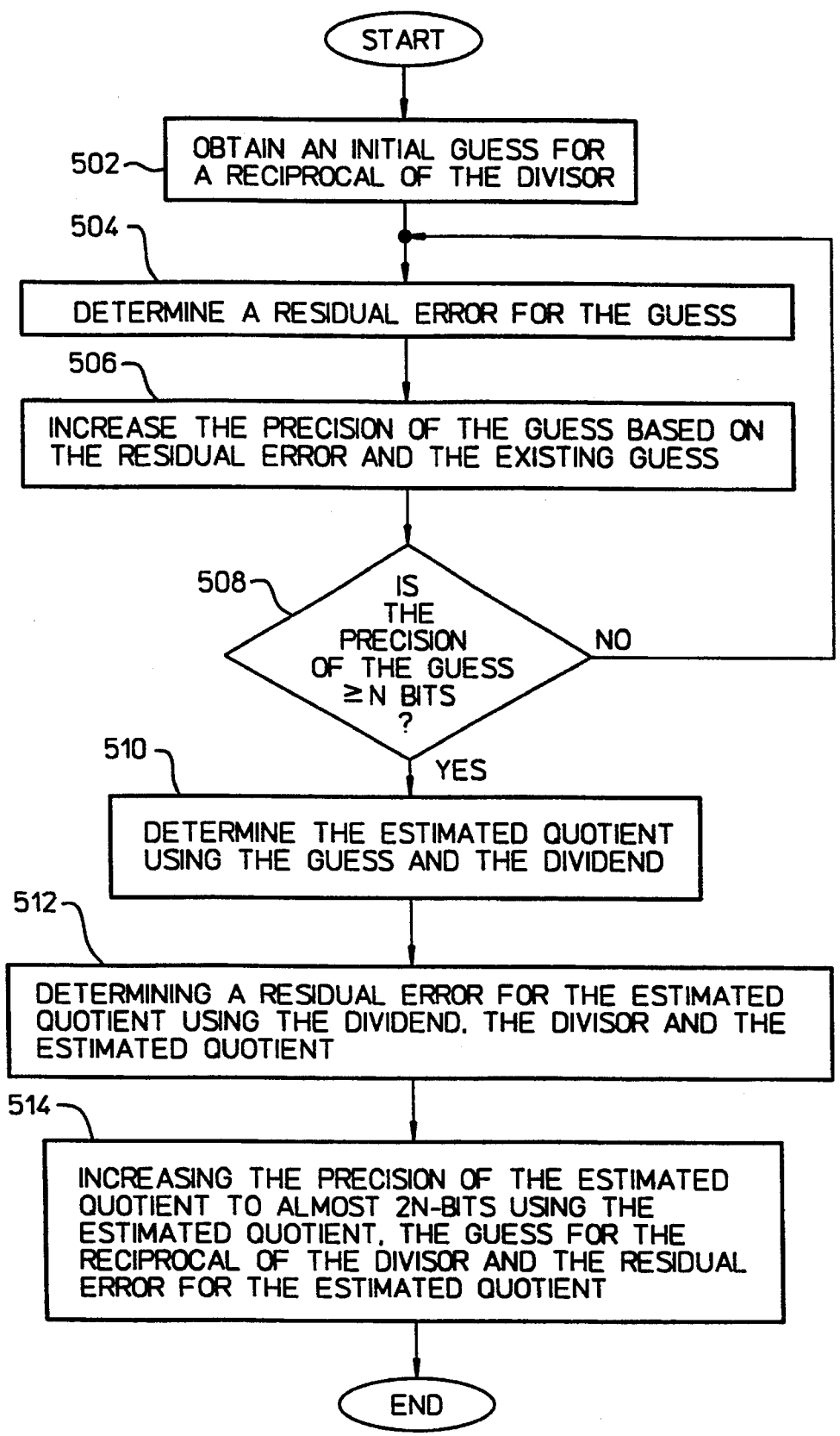
FIG. 5 is a flow chart of the detailed operations carried out by the divide microcode.

With respect to FIG. 5, Step 1 determines 510 an estimated quotient ($y_n$) using the guess ($x_n$) and the dividend (B). Then, Steps 2 and 3 determine 512 a residual error ($B - Ay_n$) for the estimated quotient. Finally, in Steps 4 and 5, the precision of the estimated quotient is increased 514 to almost 2N-bits.

Thus, for division, the only costly operation which is necessary in the last iteration is in Step 2 where a full precision number A is multiplied by a half precision number $y_n$ to produce a full precision result. As a result, the modified Newton-Raphson method achieves a substantial time savings (in processing time) because the costly multiplication of two full precision numbers (namely, a full precision $x_{n+1}$ multiplied by a full precision B) which was conventionally required is avoided. Consequentially, the modified approach of the invention speeds up the last iteration by as much as a factor of ten.

The operations performed by the square root microcode are discussed immediately below with reference to FIG. 6 which is a flow chart of the detailed operations carried out by the square root microcode. The square root microcode incorporates both the conventional Newton-Raphson method and the modified Newton-Raphson method so as to yield the benefits of the invention.

To determine a square root of a value (A), the Newton-Raphson method first determines a reciprocal of the square root of the value and then the resulting reciprocal is multiplied by the value. The square root process may be represented by the following equation.

$$\sqrt{A} = \left(\frac{1}{\sqrt{A}}\right) \times A$$

The iterations for the reciprocal of the square root of the value (A) according to the conventional Newton-Raphson method may be represented by the following equation.

$$x_{n+1} = x_n + \frac{x_n}{2}(1 - Ax_n^2)$$

The first n iterations (i.e., all but the last iteration) of a high precision calculation are performed 404 using the above equation as is conventionally done. The first iteration includes the operations of obtaining 602 an initial guess for a reciprocal of the square root from a reciprocal table such as shown in Table 2 above. All of the first n iterations include the operations of determining 604 a residual error for the guess, and increasing 606 the precision of the guess based on the residual error and the existing guess.

As in the case of division, the number of iterations required to produce the square root result to a specified precision depends on the precision of the initial guess. Since the precision doubles with each iteration, when the precision is determined 608 to be greater than or equal to N-bits, then only one more iteration is needed to obtain a result with 2N-bits of precision.

Preferably, as long as the approximation is less accurate than the base number format (i.e., <N), early iterations use hardware addition and multiplication. At each iteration beyond this accuracy, the number of digits carried is doubled to match the accuracy of the approximation, see Bailey, supra.

The invention modifies the conventional Newton-Raphson method by performing the multiplication by A before the last $(n+1^{th})$ iteration. Preferably, it is the last iteration of the conventional Newton-Raphson method for the reciprocal calculation which is modified by the invention. Namely, prior to performing the last iteration, the last iteration is multiplied by the value (A). Upon multiplication by the value (A), the above equation for the last iteration becomes the following.

$$Ax_{n+1} = Ax_n + A \frac{x_n}{2} (1 - Ax_n^2)$$

Next, the value (A) is brought inside the parenthesis, in which case the equation can be rewritten as follows.

$$Ax_{n+1} = Ax_n + \frac{x_n}{2} (A - (Ax_n)^2)$$

Thereafter, by assigning $y_n = Ax_n$ the equation may be simplified. The final iteration of the Newton-Raphson method for the square root in accordance with the invention is then expressed by the following equation.

$$y_{n+1} = y_n + \frac{x_n}{2} (A - y_n^2)$$

As with the case of division, there is significance to bringing the multiplicand inside the parentheses. Namely, the effect is that the residual error $(A - y_n^2)$ is computed based on the number being corrected, i.e., $y_n$.

The individual operations for the final iteration of the modified Newton-Raphson method may then performed 406 according to the following steps of Table 5.

TABLE 5

| | OPERATION | PRECISION |
|---|---|---|
| Step 1: | $y_n = Ax_n$<br>* only need to use high-order part of A | [half = half* × half] |
| Step 2: | $T = y_n^2$<br>* all bits of product | [full* = half × half] |
| Step 3: | $t = A - T$ | [half = full − full] |
| Step 4: | $t = x_n t/2$ | [half = half × half] |
| Step 5: | $y_{n+1} = y_n + t$<br>* leading 2n bits of the sum | [full* = half + half] |

In a multiply-add-fused (MAF) design (FIG. 2), steps 2 and 3 as well as steps 4 and 5 may be fused to together.

The result produced in Step 5 is the square root desired which is accurate to nearly the number of digits in a full precision number. Specifically, the final result is accurate to a few Units in the Last Place (ULP).

Figure 6:
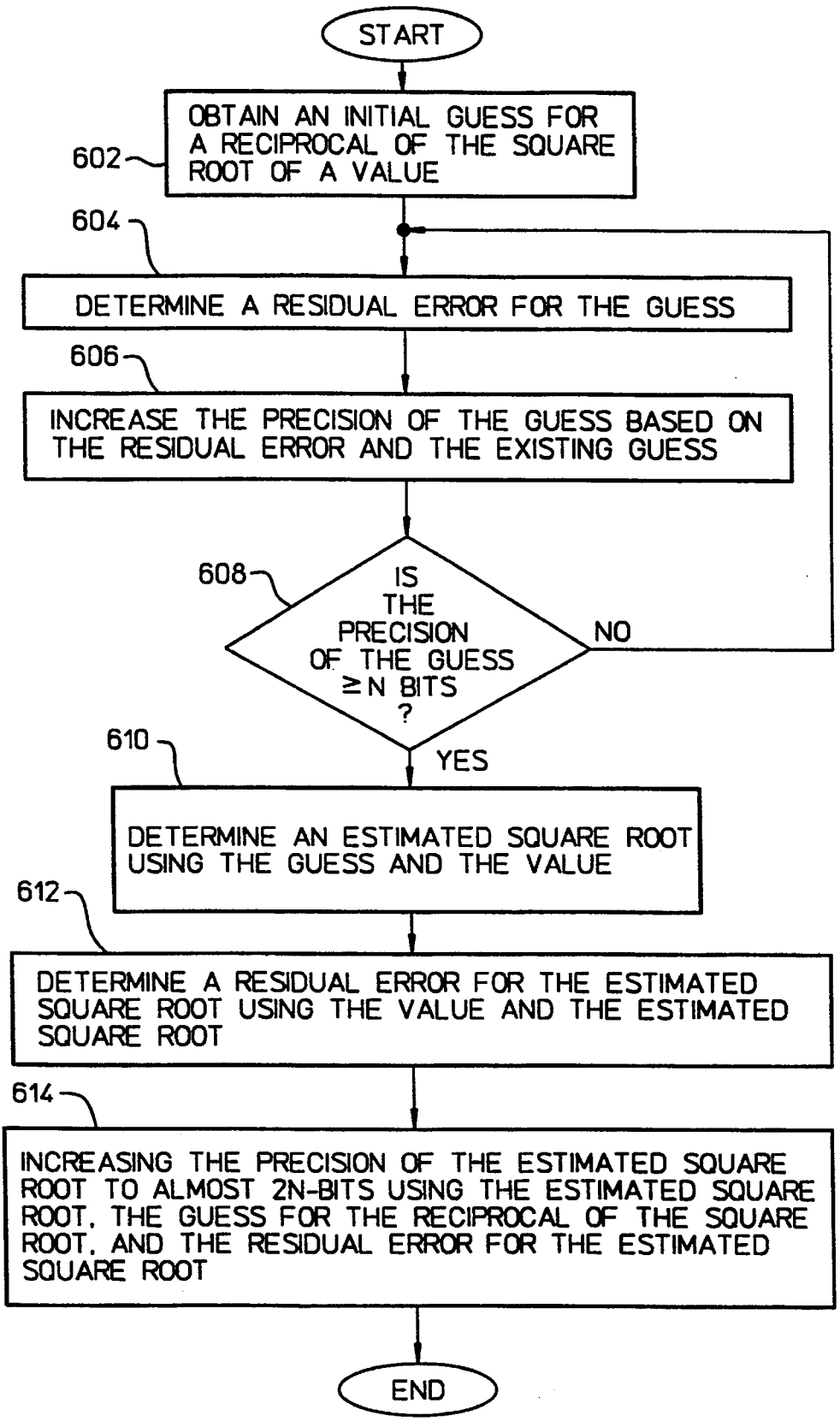
FIG. 6 is a flow chart of the detailed operations carried out by the square root microcode.

With respect to FIG. 6, Step 1 determines 610 an estimated square root ($Y_n$) using the guess ($x_n$) and the value (A). Then, Steps 2 and 3 determine 612 a residual error $(A - y_n^2)$ for the estimated square root. Finally, in Steps 4 and 5, the precision of the estimated quotient is increased 614 to almost 2N-bits.

Thus, for square root, the only necessary costly operation is in Step 2 where a full precision number product $y_n^2$ is obtained from two half precision numbers. Hence, the costly multiplication of a full precision $x_{n+1}$ times a full precision A, as conventionally required, is avoided by the invention.

The invention assumes that the hardware can provide all the digits in a product of two hardware precision numbers as well as the leading quad (e.g., 2N) precision part of a sum. Some existing computers have hardware instructions that return the quad precision result (i.e., all the digits) of multiplying two double precision numbers, other computers do not have such instructions. Some computers (e.g., IBM S/370) have instructions which return the quad precision part of the sum of two numbers.

Although it is preferable that the hardware support these requirements, if the hardware of a computer is unable to support these requirements, then software may be used in conjunction with the hardware to provide the same. An example of code which may be used to augment the hardware to return a quad precision result of the product of two double precision numbers is as follows. In this case, the variables are stored as single precision numbers. The C-language code for returning all the bits of a product of two double precision numbers stored in the single-single format is as follows.

```
void prod (a,b,c)       /* All digits of c = a*b */
    float a[], b[], c[]
{
    double t, u, v, w, x, y;
    u = (double a[0])*(double b[0]);
    v = (double a[0])*(double b[1]);
    w = (double a[1])*(double b[0]);
    x = (double a[1])*(double b[1]);
    y = v + w + (float x);
    t = u + y;
    c[0] = t;
    t = t − c[0];
    c[1] = t;
    t = t − c[1] + x − (float x);
    c[2] = t;
    c[3] = t − c[2];
}
```

Hence, the result is returned as four single precision numbers. This approach assumes that the double precision format holds at least two digits more that the product of two single precision numbers, a condition met by IEEE floating point.

A sum can contain a very large number of digits when the exponents substantially differ. The leading quad precision part (e.g., 2N-bits) of the result is required by the invention. Hence, since the hardware may not support direct retrieval of the leading 2N-bits, an example of C-language code which may be used to return the leading quad precision part of the sum of two double precision numbers is as follows.

```
void sum (a,b,c)        /* Leading 2N digits of c=a+b */
    float a[], b[], c[]
{
    double cl, ch, max, min, t;
    max = (fabs(a[0])>fabs(b[0]))?a[0]:b[0];
    min = (fabs(a[0])<=fabs(b[0]))?a[0]:b(0);
    ch = a[0] + b[0];
    t = min − (ch − max);
    cl = a[1] + b[1] + t;
    t = ch + cl
    cl = cl − (t−ch);
    c[0] = t;
    c[1] = t − c[0];
    c[2] = cl;
    c[3] = cl − c[2];
}
```

In this example, the high and low order parts of the inputs are stored in separate single precision words, the high and low parts are then added with the carry from the low order propagating to the high order. The sum is stored as four single precision numbers.

Hence, although the invention requires access to all the digits in a product of two hardware precision numbers as well as the leading 2N-bits (e.g., quad) precision part of a sum, the invention does not require any special hardware (beyond multiplier and adder-subtractor units) within the floating point arithmetic unit because software can make up for the deficiencies of the hardware. The use of such software will, however, degrade performance.

The invention is also independent of rounding mode. Nevertheless, as background information, there are four well known rounding modes. The first mode is termed round-to-nearest which selects the closest representable number in the mantissa. The second possibility is a round-to-zero which discards the fractional bits that do not fit the mantissa. This second possibility is commonly known as truncation. A third rounding mode is the round-to-positive infinity which means that the rounding is accomplished by rounding to the next largest representable number. The fourth possibility is round-to-negative infinity which rounds to the next smaller representative number. In practice, the round-to-nearest mode is most difficult to implement.

Further, a multiply-add operation can be performed as a multiplication operation followed by an addition operation which has a rounding operation associated with each. Alternatively, if fused multiply-add operations are supported by the floating point arithmetic unit, only one rounding is needed.

The divide and square root procedures discussed above are implementable in a number of ways. One way is to incorporate the procedures into microcode as has been discussed above. For example, when a divide or square root instruction is to be executed, a control unit accesses the divide and square root microcode stored within the floating point arithmetic unit. Another way is to have a compiler create the object code directly using the same procedures. For example, when compiling the code, any requests for divide or square root operations would be replaced by the appropriate sequence of add and multiply operations in accordance with the conventional and modified forms of the Newton-Raphson method.

The invention provides an improved technique for obtaining high precision results of division and square root operations that operate at a considerably faster speed than the conventional approach. This increase in computation speed is mainly due to the fact that the invention enables a floating point unit to produce a result with almost 2N-bits of precision without having to perform any 2N-by-2N bit multiplications. As a result, the invention makes the floating point hardware more practical, less complex and less expensive than conventionally required because a 2N-by-2N bit wide multiplier is not required by the invention.

The many features and advantages of the present invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of operating a data processing system for determining an approximate result of a square root or division instruction, said method comprising:

(a) receiving microcode instructions corresponding to said square root or division instruction into a control unit of the data processing system;

(b) at the direction of said control unit retrieving an approximation of a reciprocal value from a memory unit having preloaded approximate reciprocal values;

(c) at the direction of said control unit operating a floating point unit of said data processing system to perform n iterations of Newton-Raphson method to geometrically improve the precision of the approximation of the reciprocal value, where n is a positive integer, wherein multiplication and addition operations of said iterations are executed using single instruction hardware operations of said floating point unit; and (d) at the direction of said control unit operating a floating point unit of said data processing system to perform an additional iteration using a modified Newton-Raphson method to produce the final approximate result of the square root or division instruction, wherein said modified Newton-Raphson method includes the step of detecting a multiplier of said floating point unit to multiply at least one of the terms of said additional iteration by a constant.

2. A method as recited in claim 1, wherein the data processing system has a hardware precision of N-bits, where N is a positive integer, and wherein the final approximate result is produced with a precision near 2N-bits.

3. A method as recited in claim 2, wherein steps (c) and (d) are performed without any 2N-by-2N multiplications.

4. A method as recited in claim 1, wherein the modified Newton-Raphson method for the additional iteration computes the final approximate result using a residual error based on a first approximation of the final approximate result.

5. A method as recited in claim 4, wherein the final approximate result is an approximate square root of A, and the reciprocal value is a reciprocal of the square root of A, and wherein the first approximation of the result is determined by multiplying A times the approximation of the reciprocal of the square root of A produced by said performing step (c).

6. A method as recited in claim 5, wherein the first approximation of the final approximate result is a N-bit value determined by multiplying only the leading N-bits of A times the N-bits of the approximation of the reciprocal of the square root of A produced by said performing step (c).

7. A method as recited in claim 4, wherein the final approximate result is an approximate quotient of B divided by A, and the reciprocal value is 1/A, and wherein the first approximation of the final approximate result is determined by multiplying B times the approximate of the reciprocal of A produced by said step (c).

8. A method as recited in claim 7, wherein the first approximation of the final approximate result is a N-bit value determined by multiplying only the leading N-bits of B times the N-bits of the approximation of the reciprocal of A produced by said performing step (c).

9. A method for operating a floating point arithmetic unit of a computer to perform floating point division of a dividend by a divisor for producing a quotient having a mantissa with a precision of nearly 2N-bits, comprising the steps of:

(a) obtaining a current guess of a reciprocal of the divisor from a circuit operable to provide guesses of reciprocal for a number provided to said circuit;

(b) increasing the precision of the current guess of the reciprocal by computing an error parameter and computing a revised guess of the reciprocal from the error parameter and the current guess of the reciprocal;

(c) repeating step (b) until the precision of the revised guess of the reciprocal becomes at least substantially close to N bits, where N is a positive integer;

(d) operating a multiplier of said floating point unit to determine an initial guess of the quotient from the revised guess of the reciprocal times the dividend;

(e) operating an adder of said floating point unit to determine a residual error for the initial guess of the quotient based on the initial guess of the quotient; and (f) operating an adder of said floating point unit to determine the quotient from the initial guess of the quotient plus the revised guess of the reciprocal times the residual error.

10. A method of operating a floating point arithmetic unit for performing floating point square root of a value to produce a square root having a mantissa with a precision of nearly 2N-bits, comprising the steps of:

(a) obtaining a current guess of a reciprocal of the square root from a circuit operable to provide an approximate value of a reciprocal of a number provided to said circuit;

(b) increasing the precision of the current guess of the reciprocal by computing an error parameter and computing a revised guess of the reciprocal from the error parameter and the current guess of the reciprocal;

(c) repeating step (b) until the precision of the revised guess of the reciprocal becomes at least substantially close to N bits, where N is a positive integer;

(d) operating a multiplier of said floating point unit to determine an initial guess of the square root from the revised guess of the reciprocal times the value;

(e) operating an adder of said floating point unit to determine a residual error for the initial guess of the square root based on the value and the initial guess of the square root; and (f) operating a multiplier and an adder of said floating point unit to determine the square root from the initial guess of the square root plus one half of the product of the revised guess of the reciprocal times the residual error.

* * * * *